United States Patent
Kano

(10) Patent No.: US 7,252,705 B2
(45) Date of Patent: Aug. 7, 2007

(54) ZINC-RICH WATER-BASED PAINT

(75) Inventor: Tatsuya Kano, Nagoya (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/993,157

(22) Filed: Nov. 22, 2004

(65) Prior Publication Data

US 2005/0132932 A1    Jun. 23, 2005

(30) Foreign Application Priority Data

Nov. 25, 2003   (JP) .............................. 2003-394259

(51) Int. Cl.
- *C09D 1/04*   (2006.01)
- *C09D 1/00*   (2006.01)
- *C09D 1/02*   (2006.01)
- *C09D 5/10*   (2006.01)
- *C04B 12/04*  (2006.01)

(52) U.S. Cl. ............... 106/14.13; 106/14.14; 106/14.15; 106/14.42; 106/14.44; 106/623

(58) Field of Classification Search ............. 106/14.12, 106/14.15, 14.44, 14.13, 14.14, 14.42, 623
See application file for complete search history.

(56) References Cited

U.S. PATENT DOCUMENTS 5,593,492 A * 1/1997 Schaffer et al. ............. 106/623
6,468,336 B1 * 10/2002 Fiedler et al. ........... 106/14.21

FOREIGN PATENT DOCUMENTS

JP  57-25373 A  * 2/1982
JP  2004-2637    1/2004

* cited by examiner

*Primary Examiner*—Anthony J. Green
(74) *Attorney, Agent, or Firm*—Westerman, Hattori, Daniels & Adrian, LLP.

(57) ABSTRACT

A zinc-rich water-based paint blends a binder and a chelating agent in a zinc slurry. The zinc slurry is blended in an amount of 61.7% by weigh. A potassium as the binder is blended in an amount of 30.0% by weight. A blending quantity of an ion exchange water is decreased as a blending quantity of EDTA-4K as the chelating agent is increased such as 0.2, 0.4, 0.7, 1.4 and 2.4% by weigh as, so that a total quantity becomes 100%.

12 Claims, No Drawings

ZINC-RICH WATER-BASED PAINT

BACKGROUND OF THE INVENTION

1. Field of the Invention

This invention relates to a zinc-rich water-based paint that is used for a painting or coating, while mixing zinc powders with an alkali silicate as a binder before use or while mixing a binder in a previously prepared zinc powder containing slurry.

2. Description of the Related Art

Paints or coatings utilizing a sacrificial corrosion protection of a zinc to an iron are widely used as zinc-rich paints. However, most of them contain an organic solvent, so that there is a problem that they have a bad influence on the environment. On the other hand, there is a problem in an organic solvent free zinc-rich water-based paint that it produces hydrogen gas by a mixture of the zinc and a water or that it is inferior in a rust preservation capability. A zinc-rich paint containing a chromic acid as a binder is also widely used. However, there is also a problem that it has a bad influence on the environment since it contains the chromic acid.

In view of such situation, the inventor of the present invention has invented a process of obtaining a zinc-rich water-based paint and filed a patent application therefor in Japan as Japanese Patent Application No. 2002-304863. In the invention, an ion-exchange water is added to a solution of an alkali silicate so as to hydrolyze it and lower a polymerization degree thereof. Then, zinc powders are mixed in the solution. Thus, a dense coating of a silica is formed on a surface of a zinc powder, thereby preventing contact of the zinc and the water. Consequently, the zinc powders are given high stability in water. As a result, a zinc powder containing slurry is obtained at low costs, while being given the high stability. A lithium silicate is mixed as a binder in the slurry and their mixture is stirred, so that a zinc-rich water-based paint is prepared. The Japanese Patent Application has been laid open by Japanese Patent Office on Jan. 8, 2004, as Japanese Laid-Open Patent Publication No. 2004-2637. That is, the publication date of 2004-2637 is later than a priority date of the present patent application, Nov. 25, 2003. Thus, the publication 2004-2637 is not a prior art of the present application. Still, the publication 2004-2367 is cited herein since it discloses contents relating to the present invention.

If the lithium silicate is used as the binder, a stable zinc-rich water-based paint is obtained. However, the lithium silicate is expensive and is inferior in adhesive property. Therefore, a potassium silicate or a sodium silicate has been used instead of the lithium silicate since it is inexpensive and superior in the adhesive property. Still, zinc ions are dissolved in a zinc-rich water-based paint using the potassium silicate or the sodium silicate as the binder after mixing. Such dissolved zinc ions act as a gelling agent of the alkali silicate. Consequently, there is a problem that the stability of the paint and a coating property thereof go down over time.

BRIEF SUMMARY OF THE INVENTION

An object of the present invention is to provide a zinc-rich water-based paint that is free from gelation of an alkali silicate even if any binder is used in a mixture of an alkali silicate and zinc powders, thereby keeping a stability of a coating and a coating property thereof.

According to a first aspect of the invention, there is provided a zinc-rich water-based paint in which a chelating agent is added in a zinc-rich water-based paint that contains an alkali silicate and zinc powders.

Zinc ions are dissolved in the zinc-rich water-based paint after mixing the zinc powders therein. However, the zinc ions are captured or trapped by the chelating agent. Thus, the alkali silicate is never gelled by the zinc ions. Consequently, a stability of the paint and a coating property thereof do not go down over time.

The chelating agent may consist of an ethylene diamine tetraacetic acid (EDTA), an alkali metal salt of EDTA including an EDTA tetrapotassium salt, a 18-crown-6 complex, a nitrilotriacetic acid (NTA) or the like. These chelating agents coordinate to the zinc ions so as to form a stable chelate compound or a complex with a chelating ring.

Thus, even if any binder is used in the zinc-rich water-based paint prepared by mixing the alkali silicate with the zinc powders, the zinc-rich water-based paint is free from deterioration of the stability and the coating property, while preventing the alkali silicate from gelation.

The chelating agent may be added in an amount of about 0.6% by weight or more to the zinc powders.

In case the chelating agent is added to the zinc powders in the amount of about 0.6% by weight or more, the alkali silicate is never gelled by the zinc ions. Consequently, particularly the stability of the paint never goes down over time.

Thus, even if any binder is used in the zinc-rich water-based paint prepared by mixing the alkali silicate with the zinc powders, the zinc-rich water-based paint is free especially from deterioration of the stability, while preventing the alkali silicate from gelation.

Alternatively, the chelating agent may be added in an amount of about 2.3% by weight or more to the zinc powders.

In this case, essentially all of the zinc ions dissolved after mixing the zinc powders are trapped by the chelating agent. Then, the alkali silicate is never gelled by the zinc ions. Consequently, the stability of the paint and the coating property thereof improve. Particularly, a corrosion resistance improves.

Thus, even if any binder is used in the zinc-rich water-based paint prepared by mixing the alkali silicate with the zinc powders, the zinc-rich water-based paint is more improved in the stability and the coating property, while preventing the alkali silicate from gelation.

Moreover, the zinc-rich water-based paint may be further added with a surface acting agent in addition to the chelating agent.

In this case, a water dispersibility of the zinc powders each of which is covered with a dense silica coating improves more. Then, the stability of the paint is heightened still more.

Thus, even if any binder is used in the zinc-rich water-based paint prepared by mixing the alkali silicate with the zinc powders, the zinc-rich water-based paint is still more improved in the stability and the coating property, while preventing the alkali silicate from gelation.

An ethylene diamine tetraacetic acid (EDTA) or its salt may be used as the chelating agent.

In this case, the ethylene diamine tetraacetic acid (EDTA) or ions thereof coordinate to the zinc ions so as to form a very stable chelate complex (EDTA complex) in the water. The stability is superior to those of complexes produced by other chaleting agents: the 18-crown-6 complex, the nitrilotriacetic acid (NTA) or the like.

Thus, even if any binder is used in the zinc-rich water-based paint prepared by mixing the alkali silicate with the zinc powders, the zinc-rich water-based paint is still more improved in the stability and the coating property, while preventing the alkali silicate from gelation.

According to a second aspect of the invention, there is provided a zinc-rich water-based paint containing: a zinc slurry prepared by mixing zinc powders as a main component and a alkali silicate as an additive in an ion exchange water; a binder mixed in the zinc slurry; and a chelating agent mixed in the zinc slurry so as to coordinate to zinc ions to form a stable chelate compound.

The chelating agent may comprise a compound selected from a group consisting of an ethylene diamine tetraacetic acid (EDTA), an alkali metal salt of EDTA, a 18-crown-6 complex and a nitrilotriacetic acid (NTA).

The chelating agent may comprise a compound selected from a group consisting of an ethylene diamine tetraacetic acid (EDTA) and a salt of EDTA.

The chelating agent may be mixed in a proportion of about 0.6% by weight or more to the zinc powders.

Alternatively, the chelating agent may be mixed in a proportion of about 2.3% by weight or more to the zinc powders.

Alternatively, the chelating agent may be mixed within a range of about 0.6% by weight to about 2.3% by weight to the zinc powders.

An additional ion exchange water may be added and mixed at the time when the binder and the chelating agent are mixed in the zinc slurry. Then, a mixing ratio of the chelating agent and the additional ion exchange water may be adjusted such that the mixing ratio of the additional ion exchange water is decreased as the mixing ratio of the chelating agent is increased within the said range.

The zinc slurry may further contain a surface acting agent as an additive mixed therein.

The zinc slurry may contain the alkali silicate in a proportion of about 1% by weight or less.

A mixing ratio of the ion exchange water to the zinc powders may be about one to one by weight ratio.

A potassium silicate may be used as the binder and a mixing ratio of the zinc slurry to the binder may be about two to one by weight ratio.

Further objects and advantages of the invention will be apparent from the following description, reference being had to the accompanying drawings, wherein preferred embodiments of the invention are clearly shown.

DETAILED DESCRIPTION OF THE INVENTION

A preferred embodiment of the invention and its examples are described hereunder.

A manufacturing method of a zinc slurry is described first. 0.75 part by weight of a sodium metasilicate was dissolved in 49.4 parts by weight of an ion exchange water. Moreover, 0.2 part by weight of a surface acting agent was mixed therein. Thereafter, 49.5 parts by weight of zinc powders were mixed therein. Mixed materials were stirred for 16 hours so as to prepare a zinc slurry. A composition of the zinc slurry is shown in TABLE 1.

TABLE 1

| Component | % By Weight |
|---|---|
| Ion Exchange Water | 49.40 |
| Sodium Metasilicate | 0.75 |
| Surface Acting Agent | 0.20 |
| Zinc Powders | 49.50 |
| Total | 100.00 |

The zinc slurry was mixed with a potassium silicate as a binder, an ethylene diamine tetraacetic acid tetrapotassium salt (EDTA-4K) as a chelating agent, thereby preparing a zinc-rich water-based paint. A blending quantity of the EDTA-4K as the chelating agent was changed in five ways so as to prepare first to fifth examples of zinc-rich water-based paints. Moreover, a compared example was prepared for comparison in which no EDTA-4K was added. A composition of each of the examples is collectively shown in TABLE 2.

TABLE 2

| | Compared Example | First Example | Second Example | Third Example | Fourth Example | Fifth Example |
|---|---|---|---|---|---|---|
| Zinc Slurry | 61.7 | 61.7 | 61.7 | 61.7 | 61.7 | 61.7 |
| Ion Exchange Water | 8.3 | 7.7 | 7.5 | 7.2 | 6.5 | 5.5 |
| Potassium Silicate | 30.0 | 30.0 | 30.0 | 30.0 | 30.0 | 30.0 |
| EDTA-4K | 0.0 | 0.2 | 0.4 | 0.7 | 1.4 | 2.4 |
| Total | 100.0 | 100.0 | 100.0 | 100.0 | 100.0 | 100.0 |
| Adding Quantity of Chelating Agent (To Zn) | 0.0% | 0.6% | 1.2% | 2.3% | 4.4% | 7.9% |
| Stability | Gelled | Good | Good | Good | Good | Good |
| Corrosion Resistance | 24H | 72H | 120H | 648H | 648H | 648H |

As shown in TABLE 2, a blending quantity of the zinc slurry was 61.7% by weight in each of the compared example and the first to fifth examples. A blending quantity of the potassium silicate as the binder was 30.0% by weight in each of the compared example and the first to fifth examples. On the other hand, a blending quantity of the EDTA-4K as the chelating agent was increased step by step in the first to fifth examples: 0.2% by weight, 0.4% by weight, 0.7% by weight, 1.4% by weight and 2.4% by weight. A blending quantity of the ion exchange water was decreased in accordance with an increment of the chelating agent so as to make a total sum to 100%.

Each of the zinc-rich water-based paints thus prepared was tested for its stability and corrosion resistance as follows. First, with respect to the stability, a state of the paint was observed through visual inspection after it was left for 30 days at 20° C., while the paint was put in a container. As a result, a gelation was generated by dissolved zinc ions in the compared example in which no EDTA-4K was blended as the chelating agent, as shown in TABLE 2. In contrast, in each of the first to fifth embodiments, the paint was not changed and their stability was kept good. Consequently, it was found that even 0.6% of the first example, which was the least, was enough as the blending quantity (% by weight to the zinc) of the chelating agent with respect to the stability.

The corrosion resistance was tested in accordance with "7.8 Salt Spray Test" of JIS K-5400. Specifically, each of the zinc-rich water-based paints was coated on a sandblasted steel bolt by a dip spin method. Then, the coatings on the bolts were preliminarily dried for 10 minutes at 80° C. and baked on the bolt for 10 minutes at 280° C. so as to make test pieces. These test pieces were put and tested inside a salt spray test machine that produces a salt spray. A time period after which rust, scab or blister and peeling or exfoliation were generated by an action mainly of the salt spray, was checked. Use conditions of the salt spray test machine are stipulated such that a temperature in a test room is 35±1° C., a relative humidity in the test room is 95 to 98%, a temperature of a humidifier is 47±1° C., a density of a salt water or a salinity is 5 w/v % or the like.

As a result, red rust was formed after 24 hours in case of the compared example as shown in TABLE 2. The time to form the red rust was 72 hours in case of the first example. The time to form the red rust was 120 hours in case of the second example. The time to form the red rust jumped straight to 648 hours in case of the third example. Thus, the corrosion resistance improves as the adding quantity of the chelating agent increases. The time to form the red rust was 648 hours in case of the fourth and fifth examples, which exhibited the same corrosion resistance as the third example. Therefore, it was found that, in the present embodiment of the zinc-rich water-based paint, 2.3% was enough for the corrosion resistance as the adding quantity (% by weight to the zinc) of the chelating agent as seen in the third example.

Thus, even if the potassium that is inexpensive and superior in the adhesive property is used as the binder, the present embodiment of the zinc-rich water-based paint has a good stability and a long pot life if the chelating agent is added therein. Moreover, if the chelating agent is added in about 2.3% by weight or more in relation to the zinc, the zinc-rich water-based paint is given an excellent corrosion resistance.

In the present embodiment, the ethylene diamine tetraacetic acid tetrapotassium salt (EDTA-4K) is used as the chelating agent. However, another EDTA chelating agent or a chelating agent such as a 18-crown-6 complex or a nitrilotriacetic acid (NTA) may be used instead.

While, in the present embodiment, the surface acting agent is added for preparing the zinc slurry, the surface acting agent may not necessarily be used.

The present invention is not limited to the present embodiment with respect to a composition, components, a blending quantity, a material, a size, a manufacturing method or the like of other parts of the zinc-rich water-based paint.

The preferred embodiments described herein are illustrative and not restrictive, the scope of the invention being indicated in the appended claims and all variations which come within the meaning of the claims are intended to be embraced therein.

The invention claimed is:

1. A zinc-rich water-based paint, containing a chelating agent added in a zinc-rich water-based paint that contains an alkali silicate and zinc powders,
   wherein an ethylene diamine tetraacetic acid (EDTA) or its salt is used as the chelating agent, and
   wherein the chelating agent is added in an amount of about 0.6% by weight or more to the zinc powders.

2. A zinc-rich water-based paint according to claim 1, in which the chelating agent is added in an amount of about 2.3% by weight or more to the zinc powders.

3. A zinc-rich water-based paint according to claim 1, further containing a surface acting agent in addition to the chelating agent.

4. A zinc-rich water-based paint containing:
   a zinc slurry prepared by mixing zinc powders as a main component and an alkali silicate as an additive in an ion exchange water;
   a binder mixed in the zinc slurry and a chelating agent mixed in the zinc slurry so as to coordinate to zinc ions to form a stable chelate compound;
   wherein the chelating agent comprises a compound selected from a group consisting of an ethylene diamine tetraacetic acid (EDTA) and a salt of EDTA, and
   wherein the chelating agent is mixed in a proportion of about 0.6% by weight or more to the zinc powders.

5. A zinc-rich water-based paint according to claim 4, in which the chelating agent is mixed in a proportion of about 2.3% by weight or more to the zinc powders.

6. A zinc-rich water-based paint according to claim 4, in which the chelating agent is mixed within a range of about 0.6% by weight to about 2.3% by weight to the zinc powders.

7. A zinc-rich water-based paint according to claim 6, in which an additional ion exchange water is added and mixed at the time when the binder and the chelating agent are mixed in the zinc slurry, and a mixing ratio of the chelating agent and the additional ion exchange water is adjusted such that the mixing ratio of the additional ion exchange water is decreased as the mixing ratio of the chelating agent is increased within the said range.

8. A zinc-rich water-based paint according to claim 4, in which the zinc slurry further contains a surface acting agent as an additive mixed therein.

9. A zinc-rich water-based paint according to claim 4, in which the zinc slurry contains the alkali silicate in a proportion of about 1% by weight or less.

10. A zinc-rich water-based paint according to claim 9, in which a mixing ratio of the ion exchange water to the zinc powders is about one to one by weight ratio.

11. A zinc-rich water-based paint according to claim 10, in which a potassium silicate is used as the binder and a mixing ratio of the zinc slurry to the binder is about two to one by weight ratio.

12. A zinc-rich water-based paint, containing a chelating agent added in a zinc-rich water-based paint that contains an alkali silicate and zinc powders,
   wherein an ethylene diamine tetraacetic acid (EDTA) or its salt is used as the chelating agent, and
   wherein the chelating agent is added in an amount of about 1.4% by weight to the zinc powders.

* * * * *